United States Patent
Cox et al.

(10) Patent No.: US 8,339,092 B2
(45) Date of Patent: Dec. 25, 2012

(54) OUTPUT CONTACT FOR FEEDBACK IN INTEGRATED CIRCUIT MOTOR DRIVER

(75) Inventors: Peter Cox, Drongen (BE); Bart Decock, Haacht (BE)

(73) Assignee: Semiconductor Components Industries, LLC, Phoenix, AZ (US)

( * ) Notice: Subject to any disclaimer, the term of this patent is extended or adjusted under 35 U.S.C. 154(b) by 354 days.

(21) Appl. No.: 12/042,724

(22) Filed: Mar. 5, 2008

(65) Prior Publication Data

US 2008/0218113 A1    Sep. 11, 2008

(51) Int. Cl.
G05B 19/40    (2006.01)

(52) U.S. Cl. .......................................... 318/685; 318/696

(58) Field of Classification Search .................. 318/500, 318/459, 400.32, 400.34, 696, 685; 388/901, 388/928.1
See application file for complete search history.

(56) References Cited

U.S. PATENT DOCUMENTS

| | | | | | |
|---|---|---|---|---|---|
| 4,423,498 | A | * | 12/1983 | Kimura et al. | 369/47.46 |
| 4,679,102 | A | * | 7/1987 | Wevers et al. | 360/75 |
| 4,737,661 | A | * | 4/1988 | Lessig et al. | 307/140 |
| 4,978,909 | A | * | 12/1990 | Hendrix et al. | 324/76.19 |
| 5,017,845 | A | * | 5/1991 | Carobolante et al. | 318/400.11 |
| 5,182,685 | A | * | 1/1993 | Krause et al. | 360/78.13 |
| 5,378,975 | A | * | 1/1995 | Schweid et al. | 318/685 |
| 5,444,583 | A | * | 8/1995 | Ehrlich et al. | 360/78.09 |
| 5,530,326 | A | * | 6/1996 | Galvin et al. | 318/400.11 |
| 5,552,682 | A | * | 9/1996 | Ushikoshi | 318/400.38 |
| 5,584,524 | A | * | 12/1996 | Vogel | 296/39.1 |
| 5,586,306 | A | * | 12/1996 | Romano et al. | 711/112 |
| 5,592,058 | A | * | 1/1997 | Archer et al. | 318/400.09 |
| 5,767,651 | A | * | 6/1998 | Boillat et al. | 318/696 |
| 5,818,179 | A | * | 10/1998 | Kokami et al. | 318/400.04 |
| 6,065,231 | A | * | 5/2000 | Suzuki et al. | 318/700 |
| 6,081,091 | A | * | 6/2000 | Mitchell et al. | 318/685 |
| 6,504,328 | B1 | | 1/2003 | Gontowski, Jr. | |
| 6,998,801 | B2 | * | 2/2006 | Kurosawa et al. | 318/400.27 |
| 7,042,180 | B2 | * | 5/2006 | Terry et al. | 318/400.21 |
| 2002/0097066 | A1 | * | 7/2002 | Pan et al. | 324/772 |
| 2004/0222779 | A1 | * | 11/2004 | Cock et al. | 324/76.77 |
| 2005/0168862 | A1 | * | 8/2005 | Jeong | 360/75 |
| 2005/0184688 | A1 | | 8/2005 | Hirochi et al. | |
| 2005/0248305 | A1 | | 11/2005 | DeCusatis et al. | |
| 2006/0044664 | A1 | * | 3/2006 | Itagaki et al. | 360/73.03 |
| 2006/0158142 | A1 | * | 7/2006 | Kurosawa et al. | 318/254 |
| 2008/0252240 | A1 | * | 10/2008 | Sugie | 318/400.06 |

FOREIGN PATENT DOCUMENTS

| | | |
|---|---|---|
| EP | 1303036 A2 | 4/2003 |
| EP | 1443638 A2 | 4/2004 |
| EP | 1460757 A1 | 9/2004 |
| JP | 2002236136 | 8/2002 |

* cited by examiner

Primary Examiner — Rina Duda

(74) Attorney, Agent, or Firm — Rennie William Dover

(57) ABSTRACT

An integrated circuit has drive circuitry to drive the windings of an electrical motor, means to make a measurement from the drive circuitry during rotation of the motor, suitable for use as motor control feedback, and has an output contact through which the motor control feedback measurement is available as an analog output signal. It can be used with an external motor control circuit coupled to receive the analog output signal to generate motor control signals, to control the drive circuitry. The analog feedback output gives more flexibility to the design of a motor control loop in terms of bit resolution, bandwidth and choice of discrete time or continuous time control.

18 Claims, 4 Drawing Sheets

OUTPUT CONTACT FOR FEEDBACK IN INTEGRATED CIRCUIT MOTOR DRIVER

CROSS-REFERENCE TO RELATED APPLICATIONS

This patent application claims the benefit of British Patent Application Serial No. 0704439.9, filed Mar. 8, 2007, which patent application is incorporated herein by reference in its entirety.

FIELD OF THE INVENTION

The invention is related to integrated circuits for motor drivers that can make measurements for feedback purposes such as measurement of the back electromotive to drive electrical motors.

BACKGROUND OF THE INVENTION

The art recognizes the interest of integrated electrical motor driver circuit integrating as functions as possible on the same semiconductor circuit and that are flexible enough to be used for various applications. For example, the same integrated motor driver circuit may be used to control a motor with or without sensor(s). The usual sensors known to the art for control of motors are hall sensors or optical encoders. Flexibility may also concern the format of the data and the amount of data that is made available to circuit(s) and/or components external to the integrated motor driver circuit: such data can be analog or digital in nature and if digital in nature, the number of bits used to encode the data might need to vary from one application to another in function of desired characteristics for the resulting motor drive control loop.

The art does recognize the advantage that there is to use the back electromotive force (BEMF) measured across the windings at the stator of a motor to derive signals that can be used to detect a stall condition, detect the position and/or speed of the rotor of a motor, determine the load conditions of a motor. In particular as disclosed in the published patent application EP 1 460 757 A1, it may be advantageous in certain applications to measure and use the BEMF at several sampling instants instead of a single BEMF measurement.

In the application note AN235/0788 Stepper Motor Driving by H. Sax from SGS-Thomson Microelectronics (a.k.a. ST), the art also recognizes the interest there is to reduce the number of connections between a first integrated circuit (a motor driver circuit) and a second integrated circuit (a control circuit or data processing circuit, digital or otherwise, in particular a micro-controller or micro-computer chip).

TRINAMIC Motion control GmbH & Co KG offers a solution in the integrated circuit TMC 249/A. As described in the data sheet of the TMC 249/A (version 2.02 dated August 12, 2005), the BEMF of a motor is measured in order to detect a stall condition of that motor. The BEMF measurement is made available as a digital, three bits indicator that can be shared with an external micro-controller through a serial interface.

Freescale Semiconductor offers yet another solution in the integrated circuit MM908E625. This integrated circuit consists of basically 2 dies in one package: an analogue chip and a digital (microcontroller) chip. As described in the data sheet of the MM908E625 (Rev. 4.0 dated September 2005), the BEMF of a motor is measured indirectly by means of detecting the existence and duration of a recirculation current. A signal called "BEMF output" is basically a single bit flag (binary output data from an analogue comparator that is integrated in the analogue die) that indicates if (yes or no) a recirculation current in the motor exists. This flag is generated each PWM cycle during the recirculation phase and is made available as an analogue output for connection to the second die (the embedded microcontroller) for further processing inside the integrated circuit MM908E625. Because the information of the "BEMF output" is contained in the time-domain (i.e. the duration of the pulse "BEMF output" indicates the duration of the existence of recirculation current and this is a measure for the amount of BEMF), the microcontroller needs to be equipped with a timer circuit that measures the duration of the pulse. This timing information can then be transformed into other data and can be exchanged with an external circuit, in particular an external micro-controller, through a serial interface using output pins distinct from the BEMF pin.

In yet other integrated circuits, those from the ST7MC family offered by SGS-Thomson Microelectronics, information related to the BEMF is offered under the form of a single bit binary signal on a first output pin of the semiconductor chip for use by external circuitry. The actual BEMF signal is available to a micro-controller integrated in the same semiconductor substrate as the motor driver circuit, thereby eliminating the need for transmission of detailed BEMF information to an external circuit.

There remains a need to improve on the art.

SUMMARY OF THE INVENTION

An object of the invention is to provide an improved apparatus or method. Some of the embodiments of the invention can provide a more flexible integrated electrical motor driver that can interface with as many different micro-controllers as possible that can be used in both analog and discrete time feedback loop for motor control and that can satisfy various precision requirements (bit resolution and/or power dissipation, component counts, etc).

According to a first aspect of the invention, there is provided an integrated circuit having drive circuitry to drive windings of an electrical motor, the integrated circuit comprising means to make a measurement from the drive circuitry during rotation of the motor suitable for use as motor control feedback. The integrated circuit has an output contact where the motor control feedback measurement is available as an analog output signal.

An analog signal can assume a continuum of values (voltage or current) between a lower value and a higher value (e.g. between the ground reference and a supply voltage). A digital signal on the contrary is either low or high and e.g. 10 bits are necessary to encode an analog signal varying between 0 and 5V with a resolution of approximately 5 mV. Those 10 bits must either be transmitted in parallel (at the cost of more pins and more connections) or in series (at the cost of bandwidth). This unusual approach is contrary to the usual trend of more and more digital processing. It was realized, after extensive experimentation with various communication protocols, and data formats that having the motor load related information obtained by the motor driver circuit available as an analog signal on a dedicated pin of said circuit gave the highest flexibility to the circuit. In other words, it allowed the design of motor control loop (1) with any bit resolution, (2) with a bandwidth limited to the processing speed of the micro-controller (if any) used, (3) that is either discrete time or continuous time.

The analog feedback output gives more flexibility to the design of a motor control loop in terms of bit resolution, bandwidth and choice of discrete time or continuous time control.

The analog signal available on the output pin may be the result of signal processing by one or more analog and/or digital circuits (integrated in the same semiconductor substrate as the motor driver) of motor load related information. These signal processing circuits may process the signal in series or in parallel. A binary signal may determine which output of said signal processing circuits will be made available on the output pin. In particular, the signal processing circuit may be a sample and hold circuit. Often, the motor load related signal is the back electromotive force (BEMF) that is induced in the windings of the motor during operation of said motor, though other signals are conceivable.

Another aspect of the invention provides a system having the integrated circuit, and a motor control circuit coupled to receive the analog output signal. The integrated circuit according to embodiments of the present invention may be used with an external motor control circuit coupled to receive the analog output signal to generate motor control signals, to control the drive circuitry.

According to embodiments of the present invention, the system comprises an integrated circuit according to the present invention, and a motor control circuit coupled to receive the analog output signal having the motor feedback measurement signal, from the integrated circuit. The motor control circuit may be arranged to use the motor control feedback signal to generate motor control signals, the motor control signals being coupled to the integrated circuit, to control the drive circuitry.

According to some embodiments, the motor control circuit may comprise digital circuitry, and the system having a converter for converting the analog output signal to a digital signal.

Any additional features can be added without departing from the scope of the claims. Any of the additional features can be combined together and combined with any of the aspects. Other advantages will be apparent to those skilled in the art, especially over other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which.

DESCRIPTION OF EMBODIMENTS

Figure 1:
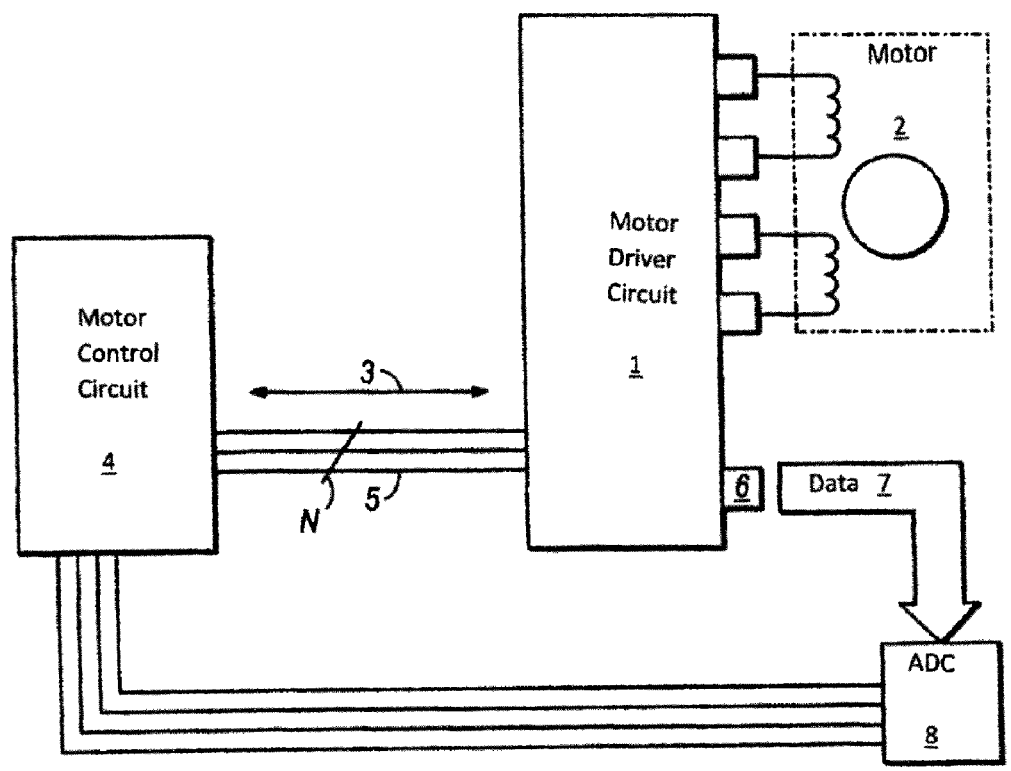
FIG. 1—Shows an integrated motor driver circuit according to embodiments of the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

It is to be noticed that the term "comprising", used in the claims, should not be interpreted as being restricted to the means/steps listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B. The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

References to an integrated circuit can encompass a semiconductor die, in which case the output contact is typically a contact pad on the die. References to an integrated circuit can also encompass a packaged die, in which case the output contact is typically a pin, or pad, or solder ball, or similar, typically coupled to the die by a wire bond. The packaging of the die can encompass any type of packaging, including resin packaging, packaging as part of a hybrid circuit having die and other components, integrated or discrete, and so on. Hence references to an output contact can encompass a contact pad on the die, a wire bond, a contact on an integrated circuit package such as a pin, solder pad, or solder ball for example.

Embodiments of the invention described below show examples of an integrated circuit having drive circuitry to drive the windings of an electrical motor, with means to make a measurement from the drive circuitry during rotation of the motor suitable for use as motor control feedback, as set out above.

Additional features of some embodiments can include the measurement comprising a motor load related, or motor speed related measurement, or the measurement means being arranged to make a number of measurements and having a first selection circuit for selecting which of the measurements is to be output.

Another such additional feature is one or more analog circuits for signal processing the motor control feedback measurement before it is output as the analog output signal. Another such additional feature is having a number of the analog circuits and having a second selection circuit for selecting which of the analog circuits is to be coupled to the output contact. At least one of the analog circuits can be a sample and hold circuit.

The motor control feedback measurement can comprise a measurement of the back electromotive force (BEMF) generated across the windings of the motor during rotation of the rotor of said motor.

It has now been appreciated that the prior art circuits suffer from several disadvantages: use of a specific communication interface (given protocol, number of bits, bit rate, etc.) that may impose limits on the bandwidth of the control loop, use of a predetermined number of bits to encode BEMF related information that impose limitations on the precision that can be achieved for the resulting motor drive, use of a given/specific micro-controller when it is in the same chip (same package or same semiconductor substrate) as the motor drive circuitry.

It has now been appreciated that there can be benefit from an integrated motor driver circuit that would reduce the number of connections between an integrated motor driver circuit and a micro-controller yet be flexible enough to satisfy the needs of motor control applications regardless of the nature of the signals (analog or digital, in particular motor load or BEMF related signals and in general signals that are function of the motor load), the number of bits used to encode signals (in particular motor load or BEMF related signals), the required bandwidth expected from the motor drive, and so on.

Figure 2:
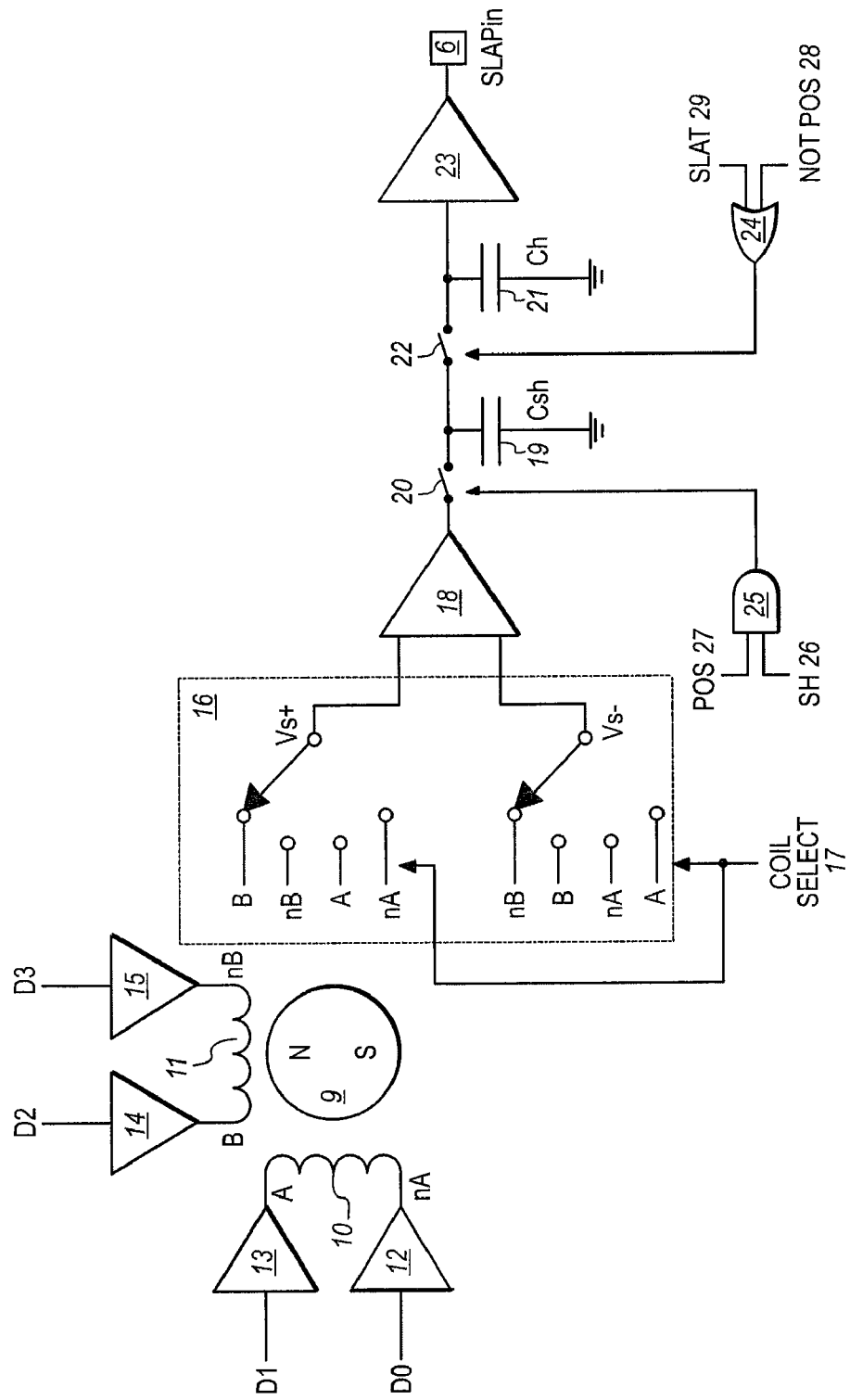
FIG. 2—Shows an example of measurement means used to generate the signal available on an output pin of the integrated motor driver circuit.

FIG. 1 shows an integrated circuit IC in the form of a motor driver circuit 1 having circuitry for driving the current in the windings of a motor 2. The motor driver IC 1 may exchange data 3 with a motor control circuit in the form of another integrated circuit 4, such as a micro-controller, through a data bus 5 linking the circuits 1 and 4. The circuit 1 makes a measurement from the drive circuitry for use as feedback in a control loop. The feedback may be in the form of a BEMF. The measurement of BEMF can be made in any way as is known from the art, and so need not be explained in more detail here. For example, it can involve measuring voltage across the windings and voltage applied, or current through the windings. The BEMF information so gathered may be signal processed (for example filtered, amplified, sampled, etc) and is made available on a dedicated output 6 of the circuit 1. The signal processing might be needed to adjust the signal voltage amplitude to the required voltage ranges of the output contact and can consist of (but not limited to) for example voltage scaling through an analogue resistive divider or amplification or offset compensation through an amplification circuit or sampling as depicted in FIG. 2. The processed BEMF related data 7 on the output contact, for example an output pin 6 is then directly available to an external circuit without having to go through the data bus 5. This means it is no longer necessary to format the BEMF related data 7 to fit the communication protocol used to exchange information between circuits 1 and 4 through the data bus 5. If the data 7 is analog in nature it might for instance be sent to an analog to digital converter (ADC) 8 with the desired resolution (contrarily to what happens in the known art) to satisfy the requirements of a given motor drive application. The analog to digital converter 8 may be a stand alone component or may be part of the circuit 4. The bandwidth of the control loop will depend on the processing power of the circuit 4 and the data conversion rate of the analog to digital converter 8. Therefore a control loop of any desired bandwidth and precision can be realized by selecting the (most) suitable micro-controller and analog digital converter (both of which exist in a multitude of variations). In some embodiments, there is no analog to digital converter 8 and the circuit 4 can be a continuous time analog regulator or filter that generates control signals transmitted on the bus 5 directly from the analog signal available on pin 6.

FIG. 2 shows how the BEMF related information can be generated and shared on the output 6. For the sake of clarity we will discuss the particular case of motor 2 being a bipolar stepper motor without intent to restrict the invention to that particular case. The windings 10 and 11 of the bipolar stepper motor are alternatively driven by drivers 12, 13, 14 and 15 (controlled by circuitry not shown through the signals D0 to D3). The drivers 12, 13, 14 and 15 are integrated in the circuit 1. The drivers can be transistors associated to form an H-bridge, or other motor drive configurations can be used. In one example, the transistors are MOS transistors in a full H-bridge. During rotation of the rotor 9, the windings are driven for a proportion of each rotation. The permanent magnet(s) located at the rotor induces a BEMF in the windings 10 and 11 at the stator. The BEMF across the winding 10 or 11 can be measured when it is not energized (that is when the drivers do not force a current through the winding or do not impose a given voltage difference across the winding). The correct winding is selected at different parts of each rotation by a first selection circuit in the form of switches 16 controlled by winding select signals 17 (the signals 17 may be generated in a number of ways known to the art by circuitry not shown on FIG. 2).

The BEMF across a given winding may be amplified and/or filtered by an amplifier and/or filter 18. The result is sampled and held under control of circuitry such as switches 20, 22 and the sampling capacitors 19 and 21. The voltage stored across capacitor 21 may be buffered by a buffer circuit 23 before being applied to the output pin 6.

The switches 20 and 22 are open or closed as a function of signals generated by logic combinations of the binary signals 26 (SH—as sample and hold signal) 27 (POS—a signal related to the position of the rotor), 28 (NOT POS being the logical inverse of POS) and 29 (SLAT) as will be discussed below. For example, the signal that closes or open the switch 20 is generated by AND-ing signals 26 and 27 with the AND gate 25. The signal that closes or open the switch 22 is generated by OR-ing signals 28 and 29 with the OR gate 25.

Figure 3:
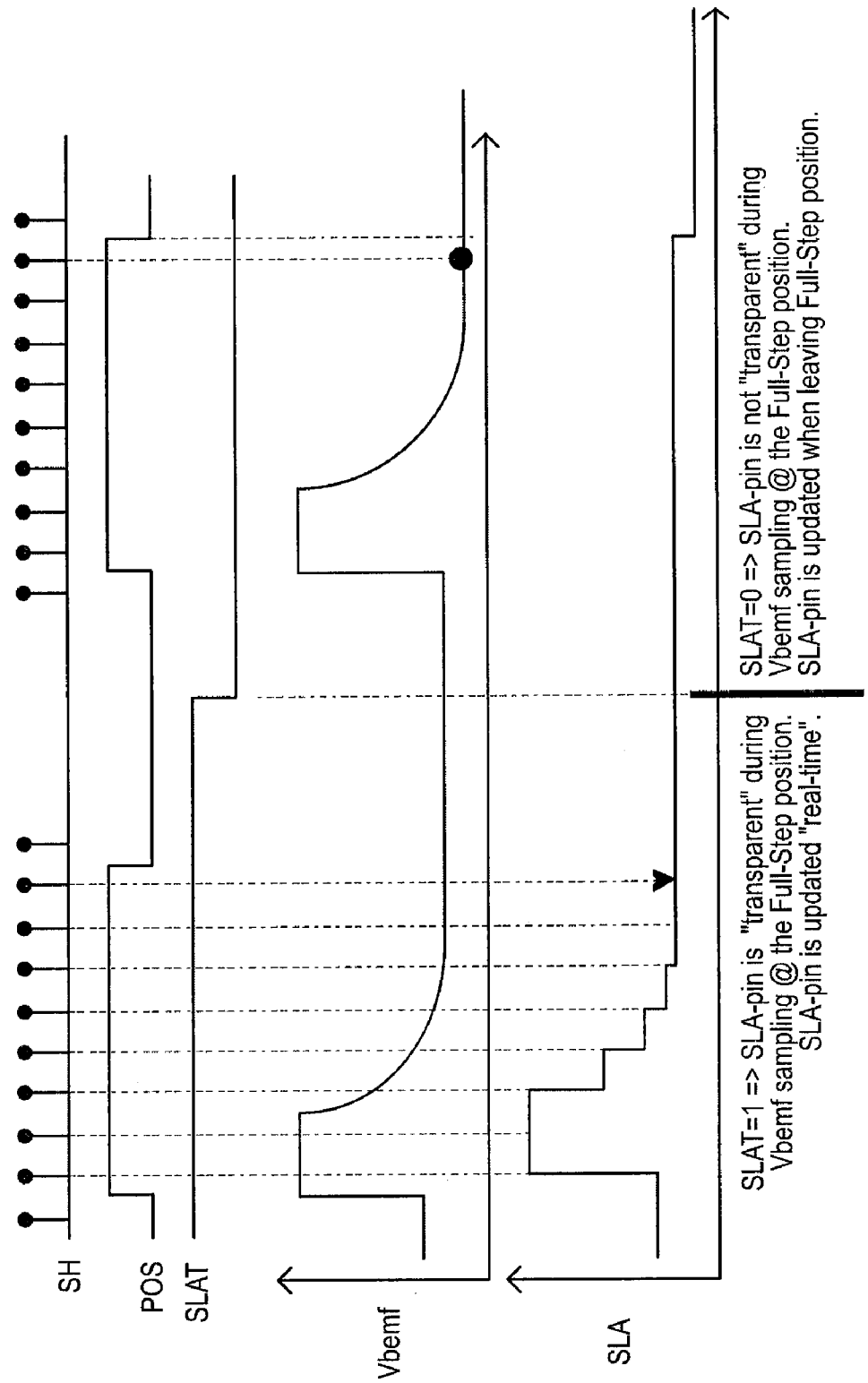
FIG. 3—Shows signals generated during operation of the integrated motor driver circuit at a number of nodes of the circuit.

The resulting signal available at the output pin 6 can be seen in the graph of FIG. 3. In FIG. 3, time is represented left to right. A top line shows a timing of signal SH, which triggers the sample hold circuit. A second line shows binary signal POS. A third line shows SLAT. The SLAT signal 29 enables the user to choose between having the samples of the BEMF signal (Vbemf on FIG. 3) successively available on output pin 6 or having a chosen sample being held on output pin 6. The binary SLAT signal may be generated by any appropriate means (for example a mechanical switch such as a dipswitch connected to circuit 1, circuit 1 itself, control signals generated by circuit 4 and sent to circuit 1 through the communication bus 5, etc).

A fourth line in FIG. 3 shows a bemf voltage signal, and the bottom line shows signal SLA, the analog output. At the left hand side, the SLA output is "transparent", and at the right hand side in this example the output is only updated at the end of the period.

Figure 4:
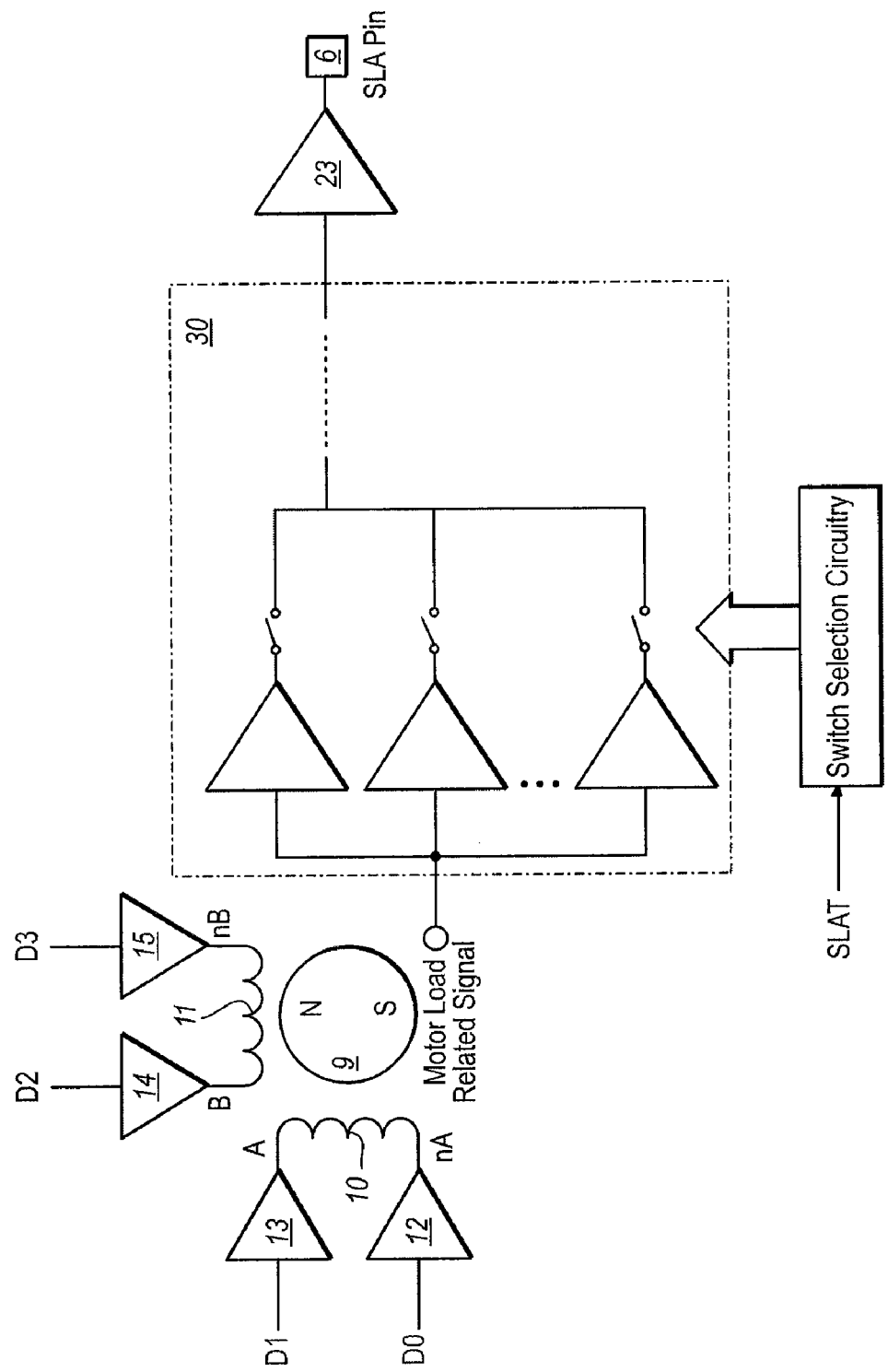
FIG. 4—Shows a generalization of the circuit example circuit of FIG. 3 to any signals that are a function of motor load and/or speed.

FIG. 4 shows another embodiment. In this case the analog processing circuitry 30 has a number of distinct signal processing circuits for processing a motor load related signal. These can process the signal in different ways. The different outputs can be selected by switching or mixing, by selection circuitry. The selection circuitry can be driven by selection signal SLAT. The selected output is fed to the output contact 6. It can be combined with the selection circuit 16 for selecting different measurements for signal processing as shown in FIG. 2.

As has been described, an output can be dedicated to an analog signal related to the back electromotive force whereas the prior art involves (a) the back electromotive force signal first being AD converted before being output over a general purpose communication port or (b) the back electromotive force signal being compared to a threshold value to generate a binary signal (Yes/No signal) made available on a dedicated output contact. Another alternative to a dedicated contact is a shared contact, for example sharing by time sharing, or by frequency sharing for example. Although the examples described show only a single output, clearly it is feasible to have two or more contacts for separate feedback signals, according to the application.

The invention claimed is:

1. An integrated circuit having drive circuitry to drive the windings of a two phase stepper motor, the integrated circuit comprising means to make a measurement using the back electromotive force generated across the windings of the two phase stepper motor during the rotation of a rotor of the two phase stepper motor, wherein the measurement means comprises a two phase stepper motor driver circuit having a plurality of input/output terminals and a plurality of driver terminals, the two phase stepper motor driver circuit comprising first and second driver circuits for coupling to a first winding and third and fourth driver circuits for coupling to a second winding, wherein the first driver circuit has a first input/output terminal coupled for receiving a first signal and a first driver terminal for coupling to the first winding, the second driver circuit has a second input/output terminal coupled for receiving a second signal and a second driver terminal for coupling to the first winding, and wherein the third driver circuit has a third input/output terminal coupled for receiving a third signal and a third driver terminal for coupling to the second winding and the fourth driver circuit has a fourth input/output terminal coupled for receiving a fourth signal and a fourth driver terminal for coupling to the second winding, the measurement suitable for use as a two phase stepper motor control feedback signal, wherein the integrated circuit comprises:
- a first switch having a control terminal, a common terminal, and first and second conduction terminals;
- an amplifier having first and second inputs and an output, the first input of the amplifier coupled to the common terminal of the first switch;
- a second switch having a control terminal, a common terminal, and first and second conduction terminals, wherein the common terminal of the second switch is coupled to the second input of the amplifier;
- a third switch having a control terminal and first and second conduction terminals, the first conduction terminal coupled to the output of the amplifier;
- a first capacitor having first and second terminals, the first terminal coupled to the second conduction terminal of the third switch; and
- an output pin through which the two phase stepper motor control feedback signal is available as an analog output signal.

2. The integrated circuit of claim 1, wherein the measurement means comprises two phase stepper motor load related or two phase stepper motor speed related measurement.

3. The integrated circuit of claim 1, wherein the measurement means is arranged to make a number of measurements and having a first selection circuit for selecting which of the measurements is to be output as the two phase stepper motor control feedback signal.

4. The integrated circuit of claim 1 further including one or more analog circuits for signal processing the two phase stepper motor control feedback signal before it is output as the analog output signal.

5. The integrated circuit of claim 4 having a number of the analog circuits and having a second selection circuit for selecting which of the analog circuits is to be coupled to the output pin.

6. The integrated circuit of claim 4 where at least one of the analog circuits is a sample and hold circuit.

7. The integrated circuit of claim 1, further including an analog to digital converter coupled to the dedicated output pin.

8. The integrated circuit of claim 7, wherein the analog to digital converter is coupled to the two phase stepper motor control circuit.

9. The integrated circuit of claim 1, further including:
- a fourth switch having a control terminal and first and second conduction terminals, the first conduction terminal coupled to the second conduction terminal of the third switch;
- a second capacitor having first and second terminals, the first terminal of the second capacitor coupled to the second conduction terminal of the fourth switch; and
- a buffer having an input and an output, the input coupled to the second conduction terminal of the fourth switch and the output serving as the output pin of the analog circuit.

10. The integrated circuit of claim 1, further including an AND logic gate having first and second inputs and an output, the output coupled to the control terminal of the third switch.

11. The integrated circuit of claim 9, further including an AND logic gate having first and second inputs and an output, the output coupled to the control terminal of the third switch.

12. The integrated circuit of claim 11, further including an OR logic gate having first and second inputs and an output, the output coupled to the control terminal of the fourth switch.

13. The integrated circuit of claim 9, further including an OR logic gate having first and second inputs and an output, the output coupled to the control terminal of the fourth switch.

14. An integrated circuit having drive circuitry to drive the windings of a two phase stepper motor, the integrated circuit comprising means to make a measurement using the back electromotive force generated across the windings of the two phase stepper motor during the rotation of a rotor of the two phase stepper motor, wherein the measurement means comprises a two phase steeper motor drive circuit having a plurality of input/output terminals and a plurality of drive terminals, the two phase stepper motor drive circuit comprising first and second drive circuits for coupling to a first winding and third and fourth driver circuits for coupling to a second winding, wherein the first driver circuit has a first input/output terminal coupled for receiving a first signal and a first driver terminal for coupling to the first winding, the second driver circuit has a second input/output terminal coupled for receiving a second signal and a second driver terminal for coupling to the first winding, and wherein the third driver circuit has a third input/out terminal coupled for receiving a third signal and a third driver terminal for coupling to the second winding and the fourth driver circuit has a fourth input/output terminal coupled for receiving a fourth signal and a fourth driver terminal for coupling to the second winding, the measurement suitable for use as a two phase stepper motor control feedback signal, wherein the drive circuitry comprises:
- a first buffer having an input and an output;
- a second buffer having an input and an output, the inputs of the first and second buffers coupled together;
- a first switch having a control terminal and first and second conduction terminals, the first conduction terminal coupled to the output of the first buffer;
- a second switch having a control terminal coupled to the output of the second buffer, the second conduction terminals of the first and second switches coupled to each other; and
- a third buffer having an input coupled to the second terminals of the first and second switches.

15. An integrated circuit having drive circuitry to drive the windings of a two phase stepper motor, the drive circuitry comprising:

a two phase stepper motor driver circuit having a plurality of input/output terminals and a plurality of driver terminals, the two phase stepper motor driver circuit comprising:

first and second driver circuits for coupling to a first winding and third and fourth driver circuits for coupling to a second winding, wherein the first driver circuit has a first input/output terminal coupled for receiving a first signal and a first driver terminal for coupling to the first winding, the second driver circuit has a second input/output terminal coupled for receiving a second signal and a second driver terminal for coupling to the first winding, and wherein the third driver circuit has a third input/output terminal coupled for receiving a third signal and a third driver terminal for coupling to the second winding and the fourth driver circuit has a fourth input/output terminal coupled for receiving a fourth signal and a fourth driver terminal for coupling to the second winding;

a first switch having a control terminal, a common terminal, and first and second conduction terminals;

an amplifier having first and second inputs and an output, the first input of the amplifier coupled to the common terminal of the first switch;

a second switch having a control terminal, a common terminal, and first and second conduction terminals, wherein the common terminal of the second switch is coupled to the second input of the amplifier;

a third switch having a control terminal and first and second conduction terminals, the first conduction terminal coupled to the output of the amplifier;

a first capacitor having first and second terminals, the first terminal coupled to the second conduction terminal of the third switch;

a fourth switch having a control terminal and first and second conduction terminals, the first conduction terminal coupled to the second conduction terminal of the third switch;

a second capacitor having first and second terminals, the first terminal of the second capacitor coupled to the second conduction terminal of the fourth switch; and a buffer having an input and an output, the input coupled to the second conduction terminal of the fourth switch and the output serving as the output pin of the analog circuit, and the integrated circuit further comprising:

a two phase stepper motor control circuit having a plurality of input/output terminals coupled to corresponding input/output terminals of the two phase stepper motor driver circuit, wherein the two phase stepper motor control circuit comprises a coil selection circuit having an input and an output and a buffer circuit having an input and an output, the input of the buffer circuit coupled to the output of the coil selection circuit; and a dedicated output pin through which an analog output signal is transmitted, wherein the dedicated output pin is coupled to the buffer circuit and the output signal serves as a measurement of the back electromotive force generated across the windings of the two phase stepper motor during rotation of the rotor of said two phase stepper motor.

16. The integrated circuit of claim 15, wherein the two phase stepper motor control circuit further comprises:

an amplifier having an input and an output, the input coupled to the output of the coil selection circuit; and sample and hold circuitry having an input and an output, the input coupled to the output of the amplifier and the output coupled to the input of the buffer.

17. The system of claim 15, wherein the two phase stepper motor driver circuit comprises digital circuitry, and the system has a converter for converting the analog output signal to a digital signal.

18. An integrated circuit having drive circuitry to drive the windings of a two phase stepper motor, the drive circuitry comprising:

a two phase stepper motor driver circuit having a plurality of input/output terminals and a plurality of driver terminals, the two phase stepper motor driver circuit comprising:

first and second driver circuits for coupling to a first winding and third and fourth driver circuits for coupling to a second winding, wherein the first driver circuit has a first input/output terminal coupled for receiving a first signal and a first driver terminal for coupling to the first winding, the second driver circuit has a second input/output terminal coupled for receiving a second signal and a second driver terminal for coupling to the first winding, and wherein the third driver circuit has a third input/output terminal coupled for receiving a third signal and a third driver terminal for coupling to the second winding and the fourth driver circuit has a fourth input/output terminal coupled for receiving a fourth signal and a fourth driver terminal for coupling to the second winding;

a first buffer having an input and an output;

a second buffer having an input and an output, the inputs of the first and second buffers coupled together;

a first switch having a control terminal and first and second conduction terminals, the first conduction terminal coupled to the output of the first buffer;

a second switch having a control terminal coupled to the output of the second buffer, the second conduction terminals of the first and second switches coupled to each other;

a third buffer having an input coupled to the second terminals of the first and second switches; and a two phase stepper motor control circuit having a plurality of input/output terminals coupled to corresponding input/output terminals of the two phase stepper motor driver circuit, wherein the two phase stepper motor control circuit comprises a coil selection circuit having an input and an output and a buffer circuit having an input and an output, the input of the buffer circuit coupled to the output of the coil selection circuit; and a dedicated output pin through which an analog output signal is transmitted, wherein the dedicated output pin is coupled to the buffer circuit and the output signal serves as a measurement of the back electromotive force generated across the windings of the two phase stepper motor during rotation of the rotor of said two phase stepper motor.

* * * * *